United States Patent [19]
Nagaoka

[11] Patent Number: 6,100,217
[45] Date of Patent: Aug. 8, 2000

[54] RETROREFLECTIVE GRAPHIC ARTICLE BEARING FLUORESCENT LEGENDS AND METHOD OF MAKING

[75] Inventor: Yoshiyuki Nagaoka, Yamagata, Japan

[73] Assignee: Minnesota Mining and Manufacturing Company, St. Paul, Minn.

[21] Appl. No.: 08/940,061

[22] Filed: Sep. 29, 1997

[30] Foreign Application Priority Data

Sep. 30, 1996 [JP] Japan ................................ 8-258514

[51] Int. Cl.⁷ ............................ G02B 5/122; G02B 5/128
[52] U.S. Cl. ........................ 503/227; 359/529; 359/530; 359/536; 427/152; 427/197; 427/372.2; 427/384; 427/385.5; 427/407.1; 427/412.1; 427/412.5; 428/142; 428/195; 428/212; 428/327; 428/407; 428/913
[58] Field of Search ...................... 359/529, 530, 359/534, 536; 427/146, 152, 180, 197, 202, 203, 372.2, 384, 385.5, 402, 407.1, 412.1, 412.5; 428/141, 142, 195, 212, 327, 407, 480, 500, 913; 503/227

[56] References Cited

U.S. PATENT DOCUMENTS

| | | |
|---|---|---|
| 4,025,159 | 5/1977 | McGrath ................................ 350/105 |
| 4,505,967 | 3/1985 | Bailey ...................................... 428/164 |
| 4,588,258 | 5/1986 | Hoopman ................................ 350/103 |
| 4,938,563 | 7/1990 | Nelson et al. ........................... 350/103 |
| 5,169,707 | 12/1992 | Faykish et al. ......................... 428/195 |
| 5,387,458 | 2/1995 | Pavelka et al. ......................... 428/141 |
| 5,450,235 | 9/1995 | Smith et al. ............................. 359/529 |
| 5,478,628 | 12/1995 | Billingsley et al. .................... 428/171 |
| 5,691,846 | 11/1997 | Benson, Jr. et al. ................... 359/530 |

FOREIGN PATENT DOCUMENTS

| | | | |
|---|---|---|---|
| 0 747 736 A1 | 12/1996 | European Pat. Off. ............... | 428/195 |
| 6-43819 | of 1994 | Japan .............................. | G09F 13/16 |
| 6-043819 | 2/1994 | Japan .................................... | 428/195 |
| 6-160615 | 6/1994 | Japan .................................... | 428/195 |
| WO 96/03285 | 2/1996 | WIPO .................................... | 428/195 |

*Primary Examiner*—Bruce H. Hess
*Attorney, Agent, or Firm*—Robert H. Jordan

[57] ABSTRACT

A retroreflective graphic article bearing a fluorescent legend comprising a retroreflective base sheet, an image layer containing one or more pigments and one or more fluorescent dyes and a dye-receiving layer containing fluorescent dye which migrated from the image layer. Also, a method for making such articles is provided.

22 Claims, 1 Drawing Sheet

RETROREFLECTIVE GRAPHIC ARTICLE BEARING FLUORESCENT LEGENDS AND METHOD OF MAKING

FIELD OF INVENTION

This invention relates to a retroreflective article having fluorescent color, and more particularly a retroreflective graphic article bearing a legend having fluorescent color that provides increased visibility and a method for making such sheeting.

BACKGROUND

It is well known that ultraviolet radiation causes colorants to degrade. This is an acute problem for articles exposed to solar radiation for extended periods of time, such as traffic signs. Color degradation occurs in articles colored with conventional colorants as well as in articles colored with fluorescent colorants, which tend to degrade more quickly than conventional dyes. Conventional colorants are those that do not exhibit fluorescent properties to the unaided eye. Whereas the life of materials with fluorescent colorants exposed to daily solar radiation is in the range of months, the life of materials with conventional colorants is typically in the range of years.

If increased visibility or conspicuity of an article is desired, it is often colored with fluorescent colorants even though they are less durable than conventional colorants. Fluorescent colors provide enhanced visibility because the visual contrast that the fluorescent colors create with the environment make the materials more conspicuous than non-fluorescent articles. Fluorescent colored traffic signs are effective at increasing the visibility of the signs thereby increasing motorists awareness to the surrounding possibly leading to increased safety. Even though fluorescent colored signs help to increase motorist safety, their use has been limited due to inadequate color stability.

Attempts have been made to try to maintain the fluorescent colors in retroreflective sheeting. For example, Japanese application JP-A-6-43189 discloses a multilayered retroreflective sheeting comprising a retroreflective base sheet having a retroreflective side, a first transparent colored layer containing a transparent pigment laminated to the retroreflective side of the base sheet, and a second transparent colored layer containing a fluorescent dye laminated to the first transparent colored layer. The reference further discloses that when the transparent pigment and the fluorescent dye are contained in the same layer, the pigment interferes with the fluorescent dye. Thus, there is a need to put the pigment and fluorescent dyes in separate layers.

Japanese application JP-A-6-160615 discloses a fluorescent retroreflective sheet comprising a transparent protective film, a transparent binder layer having glass beads with an associated reflector (such as aluminum vapor coat) partially embedded therein, and a layer containing fluorescent coloring agents disposed behind the binder layer. However, the sheeting has poor fluorescent properties because the fluorescent material is limited to areas where there are no glass beads.

U.S. Pat. No. 5,387,458 (Pavelka et al.) discloses a fluorescent retroreflective sheet comprising a transparent overlay containing a hindered amine light stabilizer, a polymeric layer containing a fluorescent dye, and optionally a cube corner layer. Although the sheeting has effective, durable, fluorescent properties and is therefore very useful in many traffic related applications such as traffic signs, it may not be as useful in applications where it is desirable to highlight only selected portions of a traffic sign. For example, if it is desirable to have symbols on a traffic sign in fluorescent color, one may need to cut the symbols from this sheeting and laminate them to a sign.

A need still exists for retroreflective sheetings that exhibit good retroreflectivity and good fluorescent properties in selected portions of the sheeting without the cumbersome process of cutting the desired symbols and laminating them to a substrate.

SUMMARY OF INVENTION

The present invention provides novel retroreflective graphic articles that exhibit surprisingly effective fluorescent properties in selected portions of the sheeting. The invention also provides a method for making such articles.

In brief summary, the inventive article is a retroreflective graphic bearing a fluorescent legend comprising (a) a retroreflective base sheet having a first surface; (b) an image layer disposed on a selected portion of the first surface, the image layer comprising a first polymeric matrix and a colorant, the colorant comprising one or more pigments and one or more fluorescent dyes; and (c) a dye-receiving layer disposed on at least a portion of the image layer, the dye-receiving layer comprising a second polymeric matrix and fluorescent dye which had migrated from the image layer into the dye-receiving layer.

The method of making a retroreflective graphic article bearing a fluorescent legend comprises the steps of (a) providing a retroreflective base sheet having a first surface; (b) forming an image layer on a portion of the first surface, the image layer comprising a first polymeric matrix and a colorant, the colorant comprising one or more pigments and one or more fluorescent dyes; (c) forming a dye-receiving layer on at least a portion of the image layer by coating a solution comprising a second polymeric matrix and a first solvent; and (d) drying the solution to remove the first solvent and such that to allow fluorescent dye to migrate from the image layer into the dye-receiving layer.

Retroreflective fluorescent sheetings of the invention differ from known retroreflective fluorescent sheetings in that although the pigment and the fluorescent dye start together in one layer (the image layer), the fluorescent dye migrates to another layer (dye-receiving layer). It is known that when a pigment is used in conjunction with a fluorescent dye, the color of the pigment overwhelms the color of the fluorescent dye thereby mitigating the effectiveness of the fluorescent color. In the inventive article, the migration of the fluorescent dye allows for excellent fluorescent properties to develop in desired areas of the sheeting, for example, to regions bearing graphics. It also allows for stabilization of the fluorescent color. Because only selected areas of the sheeting have fluorescent colors, the selected areas are more conspicuous to the motorists.

Sheetings of the invention can be used in many traffic safety applications, but is most useful in the area of traffic signs to relay information to the motorist. In particular, the inventive sheeting is especially useful during dawn and dusk where differentiation between the sign background and the indica or message is most important.

BRIEF DESCRIPTION OF THE DRAWINGS

The invention will be further explained with reference to the drawings, wherein.

These figures are idealized, are not to scale, and are intended to be merely illustrative and non-limiting.

DETAILED DESCRIPTION OF THE INVENTION

Articles of the present invention use a novel coloring system disposed on retroreflective sheetings, including known retroreflective sheetings, such as cube corner or microsphere based sheetings. The coloring system contains a multilayer film on a first surface (i.e., the retroreflective side) of the sheeting.

Figure 1:
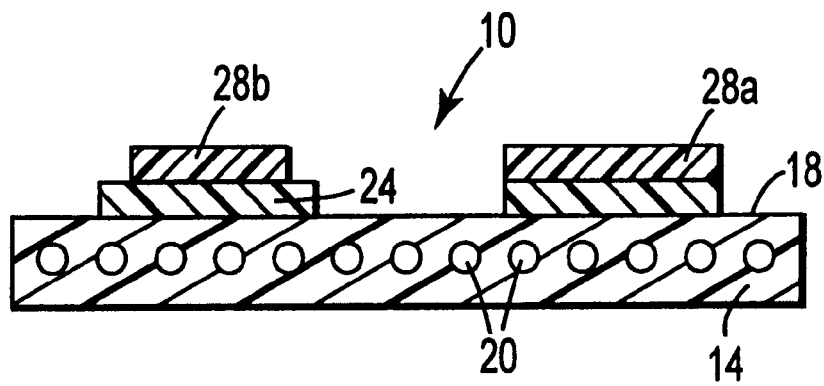
FIG. 1 is a cross-sectional view of retroreflective article 10 in accordance with the invention.

FIG. 1 shows an illustrative embodiment of the invention. Retroreflective article 10 contains microsphere based retroreflective base sheet 14 having a plurality of microspheres 20 and first surface 18. In optical association with microspheres 20 is a specular retroreflector, such as an aluminum vapor coat (not shown). Image layer 24 is disposed on a selected portion or portions of first surface 18. The image layer is typically a transparent polymer matrix that contains one or more pigments (not shown) and one or more fluorescent dyes (not shown). Dye-receiving layer 28, containing a solvent and a second transparent polymer matrix, is disposed on at least a portion of image layer 24. During fabrication, a portion of fluorescent dye in image layer 24 migrates into dye-receiving layer 28.

Figure 2:
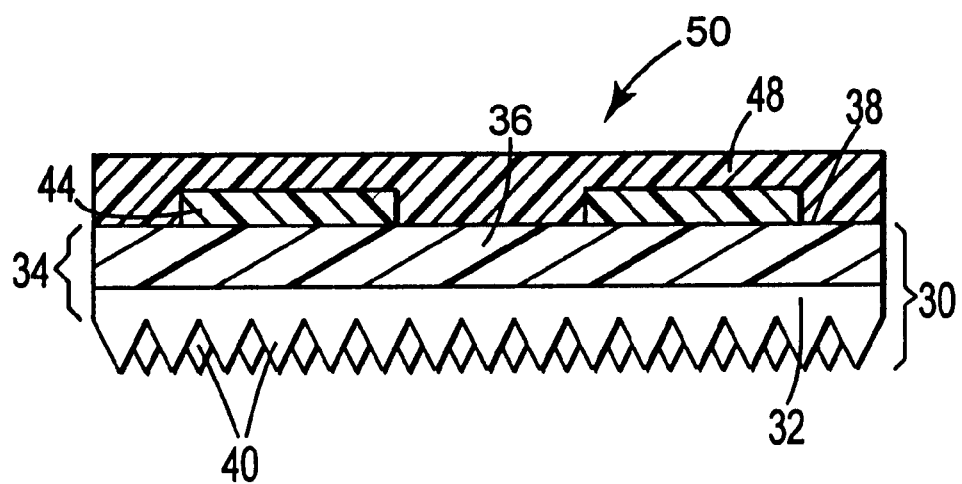
FIG. 2 is a cross-sectional view of another embodiment of retroreflective article 50 in accordance with the invention.

FIG. 2 shows another illustrative embodiment of the invention. Retroreflective article 50 contains a cube corner based retroreflective base sheet 30 comprising a plurality of cube comer elements 40 and body portion 34 which can include a land layer 32 and body layer 36. Disposed on a selected portion or portions of first surface 38 of base sheet 30 is image layer 44. The image layer is typically a transparent polymer matrix that contains one or more pigments (not shown) and one or more fluorescent dyes (not shown). Dye-receiving layer 48, containing a second transparent polymer matrix, is disposed on image layer 44 and any exposed first surface 38 of base sheet 30. During fabrication, a portion of fluorescent dye in image layer 44 migrates into dye-receiving layer 48.

Any retroreflective base sheet, either known in the prior art or those yet to be developed, that is capable to retroreflecting some portion of the incident light is useful in the practice of the invention As shown in FIGS. 1 and 2, illustrative types of useful retroreflective base sheets include microsphere based or cube corner based sheetings. The base sheet has a first surface where the image and dye-receiving layers are disposed. This first surface is the retroreflective side of the base sheet. Illustrative examples of known microsphere retroreflective base sheets suitable for use in the present invention include U.S. Pat. Nos. 4,505,967 (Bailey) and 4,025,159 (McGrath), which are incorporated herein by reference in their entirety. Useful microsphere based retroreflective sheeting include encapsulated lens or embedded lens. An encapsulated lens retroreflective sheet comprises a monolayer of retroreflective elements, e.g., a monolayer of microspheres with reflective means in association with the rear surfaces, and a cover layer sealed to the rear surface thereof. An embedded lens retroreflective sheet comprises a monolayer of microspheres having a space layer and a reflective layer in optical association with the rear surface thereof and a cover layer in which the front surface of the microspheres are embedded. Illustrative examples of known cube corner reflective base sheets suitable for use in the present invention include U.S. Pat. Nos. 5,450,235 (Smith et al.); 4,938,563 (Nelson et al.); 4,588,258 (Hoopman); and U.S. Ser. No. 08/472,444, which are incorporated herein by reference in their entirety.

The image layer is light transmissive. It comprises a first polymer matrix and a colorant, the colorant comprising one or more pigments and one or more fluorescent dyes. It is believed that there is no substantial chemical interaction between the pigment and the fluorescent dye. Suitable examples of the polymeric matrix include acrylics, polyesters, and polyvinyl chlorides. Among them, acrylics are preferred because they are light transmissive and have good weatherability, i.e., they degrade slowly under solar radiation. The weight average molecular weight of the first polymeric matrix is in the range of about 40,000 to about 200,000.

The colorants in the image layer are generally of two types, a pigment and a fluorescent dye. As used in this document, "pigment" means a substance, usually in the form of a dry powder, than imparts color to another substance. The pigment is light transmrissive comprising a first dye which is adsorbed to particles of vinyl chloride-vinyl acetate copolymer. The first dye is preferably an organic dye having a chemical structure comprising a ring moiety and a chromophoric group chemically bonded thereto. Organic dyes are preferred because they are typically light transmissive. The vinyl chloride-vinyl acetate copolymer is compatible with many organic dyes because the dyes are typically polar compounds. Furthermore, the first dye may be fluorescent. An example of a suitable fluorescent, organic, first dye is perylene, which has a chemical structure containing a perylene backbone and a functional group such as n-aryl carboxylic imide as a chromophoric group. Other examples of suitable organic dyes include diketopyrrolopyrol and quinacridine compounds.

The pigment can be prepared in the following manner. The vinyl chloride-vinyl acetate copolymer and the first dye are mixed in an organic solvent in which both are dissolved. After removing and drying the organic solvent, the residue is pulverized to yield the pigment. Illustrative examples of suitable pigments for use in the present invention include red perylene pigments available from Bayer AG under product numbers MILSTOCK™ CVR-743M and MILSTOCK™ CVR-1550, and from BASF, under product number PALIO-FAST™ 3530.

The pigments comprise about 1 to about 50 weight percent, preferably about 5 to about 30 weight percent, and more preferably about 7 to about 20 weight percent of the first polymer matrix. When the pigment comprise less than 1 weight percent of the first polymer matrix, the color may not develop sufficiently. When the pigment comprise more than 50 weight percent of the first polymer matrix, the image layer may no longer be light transmissive and also the fluorescence properties, discussed in detail below, may deteriorate.

The fluorescent dyes, which shall be termed as the "second dye" for clarity purposes, absorb visible light selectively and emit fluorescence as a result of spontaneous emission of absorbed visible light energy. Like the first organic dyes, the second dye has a chemical structure comprising a ring moiety, such as a benzene ring or a heterocylic ring, and a chromophoric group chemically bonded to the ring moiety. Suitable fluorescent second dyes for use in the present invention include perlyene, thioxanthene, thioindigo, benzoxazole-cumarine dyes. Among them, perlyene is preferred for its good weatherability and good fluorescence.

In the image layer, the fluorescent second dyes comprise about 0.1 to about 5 weight percent, preferably about 0.3 to about 2 weight percent, of the first polymer matrix. When the fluorescent second dye comprises less than 0.1 weight percent of the first polymeric matrix, a sufficient amount of fluorescent color may not develop. When the fluorescent second dye comprises more than 5 weight percent of the first polymeric matrix, the dye tends to agglomerate.

The vinyl chloride-vinyl acetate copolymer comprises about 75 to about 98 weight percent, preferably about 80 to about 95 weight percent of vinyl chloride monomer units, and about 1 to about 25 weight percent, preferably about 3 to about 15 weight percent of vinyl acetate monomer units. When the amount of vinyl chloride monomer units is too low, i.e., below 75 weight percent of the vinyl chloride-vinyl acetate copolymer, fluorescent second dye is absorbed by the copolymer thereby prohibiting the migration of fluorescent dye to the dye-receiving layer. When the amount of vinyl chloride monomer unit is too high, i.e., exceeding 98 weight percent of the vinyl chloride-vinyl acetate copolymer, the copolymer compatibility with the first dye decreases during the pigment preparation step and the light transmissive property of the resultant pigment may deteriorate.

Other than the vinyl chloride and vinyl acetate monomers, one or more hydrophilic monomers such as vinyl alcohol, acrylic acid, and maleic acid may be contained in the copolymer at about 1 to about 10 weight percent. An example of a copolymer present as a result of a combination of the hydrophilic monomer with the predominant vinyl chloride or vinyl acetate monomer include vinyl chloride-vinyl acetate-vinyl alcohol copolymer (commonly known as VAGH™).

The dye-receiving layer is disposed immediately above at least a portion of the image layer and optionally a portion of the first surface of the retroreflective surface. The dye-receiving layer comprises a second transparent polymeric matrix and fluorescent dye that is not initially present therein but migrates into the layer from the image layer. As a portion of fluorescent dye leaves the image layer and migrates into the dye-receiving layer, fluorescent color is developed. Because the image layer can be selectively applied to portions of the base sheet, the fluorescent color can be concentrated in the areas where information is being relayed to the motorist. For example, a traffic sign bearing a legend (e.g., "Rough Road Ahead") could be highlighted with a fluorescent color making the sign more conspicuous to the motorist. Because the legend is fabricated from transparent colorants, the marked area is capable of some retroreflectivity. In the regions where no legend is present, the retroreflective base sheet is able to retroreflect incident light without being inhibited with a legend. The result is a conspicuous and efficient retroreflective traffic sign.

Illustrative examples of transparent, second polymeric matrices suitable for use in the present invention include acrylic, polyester, and polyvinyl chloride resins. These resins are particularly useful with a perylene fluorescent dye. Among the illustrative resins, acrylic resin is preferred because it is compatible with fluorescent dyes so that migration of fluorescent dye from the image layer to the dye-receiving layer is easily achieved. The weight average molecular weight of the second polymeric matrix is in the range of about 40,000 to about 200,000.

An illustrative method of making a retroreflective graphic article bearing a fluorescent legend is as follows. A retroreflective base sheet is provided having a first surface. On a selected portion or portions of the first surface of the base sheet an image layer is formed. A dye-receiving layer is formed on at least a portion of the image layer and optionally on at least an exposed portion of the first surface of the base sheet. The base sheet with its image and dye-receiving layers are dried at a sufficient time and sufficient heat to cause fluorescent dye in the image layer to migrate into the dye-receiving layer.

The image layer is formed on the retroreflective base sheet by coating a solution containing a first polymeric matrix and colorants, i.e., pigments and fluorescent dyes. The solid content for the image layer solution is typically about 10 to about 50 weight percent. Any coating method known in the art capable of forming images on a substrate can be used to coat the image layer of the present invention. Illustrative coating methods suitable for use in the present invention include screen printing or gravure printing. Typically, the image layer bears a legend or symbol and covers only a portion of the base sheet retroreflective area.

The dry thickness of the image layer is in the range of about 1 to about 50 micrometers, preferably about 5 to about 20 micrometers. One skilled in the art should take care to balance the thickness needed to achieve sufficient color properties with the light transmissive properties of the image layer. Thus, if the image layer is less than 1 micrometer in thickness, the color in the image layer will not be strong enough to impart information to the motorists. If the image layer is thicker than 50 micrometers, its light transmissivity decreases impairing the retroreflective brightness of the legend.

A solution forming the dye-receiving layer is coated on top of at least a portion of the image layer. Typically, the dye-receiving layer will cover the entire surface area of the image layer and may cover the exposed portions of the retroreflective base sheet as well. Any coating method known in the art capable of forming layers on a substrate can be used in the present invention. Illustrative coating methods suitable for use in coating the dye-receiving layer of the present invention include knife coating, bar coating, roll coating, and die coating. The dry thickness of the dye-receiving layer is typically range of about 1 to about 50 micrometers, preferably about 3 to about 30 micrometers, and more preferably about 5 to about 20 micrometers. One skilled in the art should take care to balance the thickness needed to achieve sufficient color properties with the light transmissive properties of the dye-receiving layer.

As stated, during the drying step, fluorescent dye from the image layer migrates into the dye-receiving layer. Some factors that affect the migration of the fluorescent dye include, for example, the solvent used in the dye-receiving layer solution, the drying time and temperature of the dye-receiving layer, the type of second polymeric matrix, and the amount of fluorescent dye present in the image layer.

The solvent used for the dye-receiving layer solution should provide good solubility for fluorescent dye and for the second polymeric matrix. The solubility parameter of the solvent is preferably about 8.0 to about 11.0, more preferably about 8.2 to about 10.0. The solubility parameter ($\delta$) is calculated from the molar heat of evaporation ($\Delta H$) and the molar volume (V) according to the Hilderbrand equation:

$$\delta = (\Delta H/V)^{1/2}$$

The solvent should also have an adequate evaporation rate so as to yield a reasonable drying time. The evaporation rate of the solvent is preferably about 5 to about 50, more preferably about 10 to about 40, when the evaporation rate of butyl acetate is 100. Illustrative examples of the solvent suitable for use in the present invention include cylcohexanone (having a solubility parameter of 9.9 and an evaporation rate of about 20 to about 30), and propylene-glycol monomethylether acetate, commonly known as DOWNAL™ PMA (having a solubility parameter of 9.2 and an evaporation rate of about 30 to about 40). The evaporation rate is measured according to ASTM D 3539-76.

The weight ratio (M:S) of the second polymeric matrix (M) to the solvent (S) contained in the solution for the dye-receiving layer is about 10:90 to about 50:50, preferably about 15:85 to about 45:55, and more preferably about 20:80 to about 40:60. When the solvent quantity is low, fluorescent dye migrates slower from the image layer to the dye-receiving layer. When the solvent is in excess, the drying rate is affected, typically decreasing the drying rate thereby possibly lowering throughput.

Important parameters for the drying of the dye-receiving layer includes temperature and time. The drying temperature is typically between about room temperature (25° C.) and 150° C., preferably about 30° C. to about 140° C., and more preferably about 40° C. to about 130° C. The drying time is typically between about 1 minute and about 72 hours, preferably about 2 minutes to about 1 hour, and more preferably about 5 minutes to about 30 minutes. One skilled in the art must take care to choose an appropriate drying temperature and drying time to allow fluorescent dye to migrate from the image layer to the dye-receiving layer and to allow for reasonable throughput, but not to affect adversely the retroreflective properties of the base sheet.

EXAMPLES

The following examples are provided to illustrate different embodiments and details of the invention. The particular ingredients and amounts used as well as other conditions and details are not to be construed in a manner that would unduly limit the scope of this invention. All amounts are in parts by weight unless otherwise indicated.

All samples were measured for several values including fluorescent appearance (qualitatively measured by human observation) and color properties such as lightness (L*), hue (a*) and saturation (b*). These color properties were measured using a xenon color meter. Some samples were measured for brightness at an incident angle of −4° and an observation angle of 0.20° (using a Model 920 retrophotometer, manufactured by Advanced Retro Technology) and reported in units of candelas/square meter/lux (cpl).

Example 1

A retroreflective graphic article was made as follows. An image layer coating solution had the following components:

| Components (for the image layer solution) | Parts |
|---|---|
| acrylic resin (ACRYLOID ™ B66, from Rohm & Haas) | 34.6 |
| light transmissive pigment (CBR-743M, from Custom Chemical Corp.) | 6.8 |
| fluorescent dye (Lumogen F Red 300, from BASF) | 0.5 |
| solvent (DOWNAL ™ PMA, from Dow Chemical) | 63.6 |
| solvent (cyclohexanone) | 18.8 |

The solution was screen printed on the retroreflective surface of SCOTCHLIGHT™ 2990 base sheet, available from Minnesota Mining and Manufacturing (3M), using a 150 mesh screen with a legend "STOP." The solution was dried at a about 65° C. for about 15 minutes to yield an image layer, which had a dry thickness of about 10 micrometers.

A dye-receiving layer coating solution had the following components:

| Components (for the dye-receiving layer) | Parts |
|---|---|
| acrylic resin (ACRYLOID ™ B66, from Rohm & Haas) | 34.6 |
| solvent (DOWNAL ™ PMA, from Dow Chemical) | 54.5 |
| solvent (cyclohexanone) | 9.7 |

The solution was bar coated on the entire surface area of the retroreflective base sheet covering the previously screen printed image layer and exposed portions of the base sheet. The solution was dried at about 65° C. for about during which time fluorescent dye migrated from the image layer into this newly coated dye-receiving layer and bears the legend "STOP." The dry thickness of the dry-receiving layer was about 10 micrometers.

This sample was subjected to several tests yielding the results shown in Table 1. Furthermore, they were subjected to 1,500 hours of exposure using a xenon weatherometer yielding the results in Table 2.

Examples 2 to 8

Retroreflective graphic articles were made according to Example 1 except that the drying conditions for the dye-receiveng layer were changed as follows:

| Example No. | Drying Temperature (° C.) | Drying Time |
|---|---|---|
| 2 | 25 | 72 hours |
| 3 | 40 | 15 minutes |
| 4 | 40 | 30 minutes |
| 5 | 40 | 72 hours |
| 6 | 65 | 30 minutes |
| 7 | 100 | 30 minutes |
| 8 | 130 | 5 minutes |

These samples were subjected to several tests yielding the results shown in Table 1.

Examples 9 and 10

Retroreflective graphics articles were made according to Example 1 except that the quantity of light transmissive pigment added to the image layer solution was changed as follows:

| Example No. | Parts of Pigment |
|---|---|
| 9 | 4.8 |
| 10 | 2.7 |

These samples were subjected to several tests yielding the results shown in Table 1. Furthermore, they were subjected to 1,500 hours of exposure using a xenon weatherometer yielding the results shown in Table 2.

Examples 11 to 14

Retroreflective graphics articles were made according to Example 1 except that the quantity of fluorescent dye added to the image layer solution was changed as follows:

| Example No. | Parts of Fluorescent Dye |
| --- | --- |
| 11 | 0.3 |
| 12 | 0.4 |
| 13 | 0.5 |
| 14 | 0.7 |

All of these had good fluorescent properties as measured by human observation.

Comparative Example A

A retroreflective graphics article was made according to Example 1 except that the dye-receiving layer was not formed. As shown in Table 1, without the dye-receiving layer, the legend "STOP" did not have good fluorescent appearance.

Comparative Examples B to F

Retroreflective graphic articles were made according to Example 1 except that instead of having a dye-receiving layer coated on the retroreflective surface of the base sheet, a transparent polymeric film into which fluorescent dye would not readily migrate was laminated thereto and heated for a set time and temperature.

The transparent polymeric film used was a dual layer film having (1) an acrylic layer containing ethylene-acrylic acid copolymer having a thickness of about 50 micrometers, and (2) an acrylic tackifier layer containing isooctyl acrylate-acrylic acid copolymer having a thickness of about 20 to about 30 micrometer. The polymeric film was laminated to the retroreflective base sheet bearing an image layer at room temperature of about 25° C. with the tackifier layer contacting the image layer and the retroreflective surface of the base sheet. The heating conditions varied as follows:

| Comparative Example | Drying Temperature (° C.) | Drying Time |
| --- | --- | --- |
| B | 65 | 15 minutes |
| C | 65 | 30 minutes |
| D | 65 | 72 hours |
| E | 100 | 30 minutes |
| F | 130 | 5 minutes |

These samples were subjected to several tests yielding the results shown in Table 1. Because there was little migration of the fluorescent dye from the image layer to the dye-receiving layer, the resultant fluorescent appearances of Comparative Examples B to G were similar to that of Comparative Example A where there was no dye-receiving layer at all.

TABLE 1

| Example No. | Fluorescent Appearance[1] | Lightness (L*) | Hue (a*) | Saturation (b*) |
| --- | --- | --- | --- | --- |
| 1 | Good | 38.9 | 72.7 | 52.8 |
| 2 | Good | 38.2 | 69.7 | 51.5 |
| 3 | Good | 37.9 | 70.6 | 51.0 |
| 4 | Good | 38.4 | 69.7 | 53.5 |
| 5 | Good | 38.7 | 68.8 | 49.5 |
| 6 | Good | 37.3 | 67.0 | 49.9 |
| 7 | Good | 39.2 | 67.8 | 51.8 |

TABLE 1-continued

| Example No. | Fluorescent Appearance[1] | Lightness (L*) | Hue (a*) | Saturation (b*) |
| --- | --- | --- | --- | --- |
| 8 | Good | 40.6 | 73.8 | 57.3 |
| 9 | Good | 39.9 | 71.2 | 51.7 |
| 10 | Good | 43.6 | 76.7 | 55.7 |
| Comparative A | No Good | 34.7 | 64.1 | 45.7 |
| Comparative B | No Good | 34.4 | 61.7 | 40.8 |
| Comparative C | No Good | 34.2 | 62.0 | 41.7 |
| Comparative D | No Good | 35.4 | 60.8 | 41.4 |
| Comparative E | No Good | 33.8 | 61.8 | 44.0 |
| Comparative F | No Good | 35.5 | 62.8 | 45.4 |

[1]The value of "Good" meant that the legend "STOP" was sufficiently bright and visibly clear at dusk time. The value "No Good" meant that it was difficult for an individual to discern the legend "STOP" at dusk time.

TABLE 2

(After 1500 hours in a xenon weatherometer)

| Example No. | Brightness (cpl) | Lightness (L*) | Hue (a*) | Saturation (b*) |
| --- | --- | --- | --- | --- |
| 1 | 119 | 35.1 | 57.0 | 42.5 |
| 9 | 133 | 35.6 | 57.5 | 44.9 |
| 10 | 138 | 39.4 | 57.9 | 47.4 |
| Comparative A | 123 | 31.2 | 55.8 | 36.3 |
| Comparative B | 107 | 32.6 | 59.4 | 37.6 |

What is claimed is:

1. A retroreflective graphic article bearing a fluorescent legend comprising:
   (a) a retroreflective base sheet having a first surface;
   (b) an image layer disposed on a selected portion of said first surface, said image layer comprising a first polymeric matrix and a colorant, said colorant comprising one or more pigments and one or more fluorescent dyes; and
   (c) a dye-receiving layer disposed on at least a portion of said image layer, said dye-receiving layer comprising a second polymeric matrix and fluorescent dye which had migrated from said image layer into said dye-receiving layer.

2. The retroreflective article of claim 1, wherein said dye-receiving layer covers at least a portion of said first surface of said retroreflective sheet.

3. The retroreflective article of claim 1, wherein said retroreflective base sheet is selected from the group consisting of embedded lens beaded sheeting, encapsulated lens beaded sheeting, and cube corner based sheeting.

4. The retroreflective article of claim 1, wherein said image layer is about 1 to about 50 micrometers thick.

5. The retroreflective article of claim 1, wherein said first polymeric matrix is light transmissive.

6. The retroreflective article of claim 5, wherein said first polymeric matrix is selected from one of the group consisting of acrylic, polyester, and polyvinyl chloride resin.

7. The retroreflective article of claim 1, wherein said pigment comprises a dye adhered to particles of vinyl chloride-vinyl acetate copolymer.

8. The retroreflective article of claim 7, wherein said dye is organic and has a chemical structure comprising a ring moiety and a chromophoric group chemically bonded to said ring moiety.

9. The retroreflective article of claim 7, wherein said vinyl chloride-vinyl acetate copolymer comprises about 75 to about 98 weight percent vinyl chloride and about 1 to about 25 weight percent vinyl acetate.

10. The retroreflective article of claim 1, wherein said pigment comprises about 1 to about 50 weight percent of said first polymeric matrix.

11. The retroreflective article of claim 1, wherein said fluorescent dye has a chemical structure comprising a ring moiety and a chromophoric group chemically bonded to said ring moiety.

12. The retroreflective article of claim 1, wherein said fluorescent dye comprises about 0.1 to about 5 weight percent of said first polymeric matrix.

13. The retroreflective article of claim 1, wherein said second polymeric matrix is light transmissive.

14. The retroreflective article of claim 1, wherein said dye-receiving layer is about 1 to about 50 micrometers thick.

15. A method of making a retroreflective graphic article bearing a fluorescent legend, which method comprises the steps of:
   (a) providing a retroreflective base sheet having a first surface;
   (b) forming an image layer on a portion of said first surface, said image layer comprising a first polymeric matrix and a colorant, said colorant comprising one or more pigments and one or more fluorescent dyes;
   (c) forming a dye-receiving layer on at least a portion of said image layer by coating a solution comprising a second polymeric matrix and a first solvent; and
   (d) drying said solution to remove the first solvent and to allow fluorescent dye to migrate from said image layer into said dye-receiving layer.

16. The method of claim 15, wherein said pigment is made by a method comprising the steps of:
   (a) providing an organic dye;
   (b) providing a vinyl chloride-vinyl acetate base copolymer,
   (c) dissolving said dye said copolymer in a second solvent;
   (d) removing said organic solvent to yield a residue; and
   (e) pulverizing said residue to form said pigment.

17. The method of claim 15, wherein in step (d) said drying step occurs at a temperature of about 25° to about 150° C.

18. The method of claim 15, wherein in step (d) said drying step has a drying time of about 1 minute to about 72 hours.

19. The method of claim 15, wherein said first solvent has a solubility parameter between 8 and 11.

20. The method of claim 15, wherein said first solvent has an evaporation rate of about 5 to about 50 when the evaporation rate of butyl acetate is 100.

21. The method of claim 15, wherein said second polymeric matrix is about 10 to about 50 percent by weight of said solution.

22. The method of claim 15, wherein said solution is coated on at least a portion of said first surface of said base sheet.

* * * * *

UNITED STATES PATENT AND TRADEMARK OFFICE
CERTIFICATE OF CORRECTION

PATENT NO. : 6,100,217
DATED : August 8, 2000
INVENTOR(S) : Yoshiyuki Nagaoka

Page 1 of 1

It is certified that error appears in the above-identified patent and that said Letters Patent is hereby corrected as shown below:

Column 4,
Line 18, "than" should read -- that --.
Line 19, "transmrissive" should read -- transmissive --.

Column 6,
Line 38, please insert -- in the -- between "typically" and "range".

Column 7,
Line 65, please delete "a" following "at".

Column 8,
Line 14, please insert -- 15 minutes -- between "about" and "during".

Signed and Sealed this

Sixteenth Day of April, 2002

Attest:

JAMES E. ROGAN
Director of the United States Patent and Trademark Office

*Attesting Officer*